Sept. 21, 1965 C. F. BATEMAN 3,207,370
REMOTE DISPENSING SYSTEM
Filed July 10, 1963 5 Sheets-Sheet 2
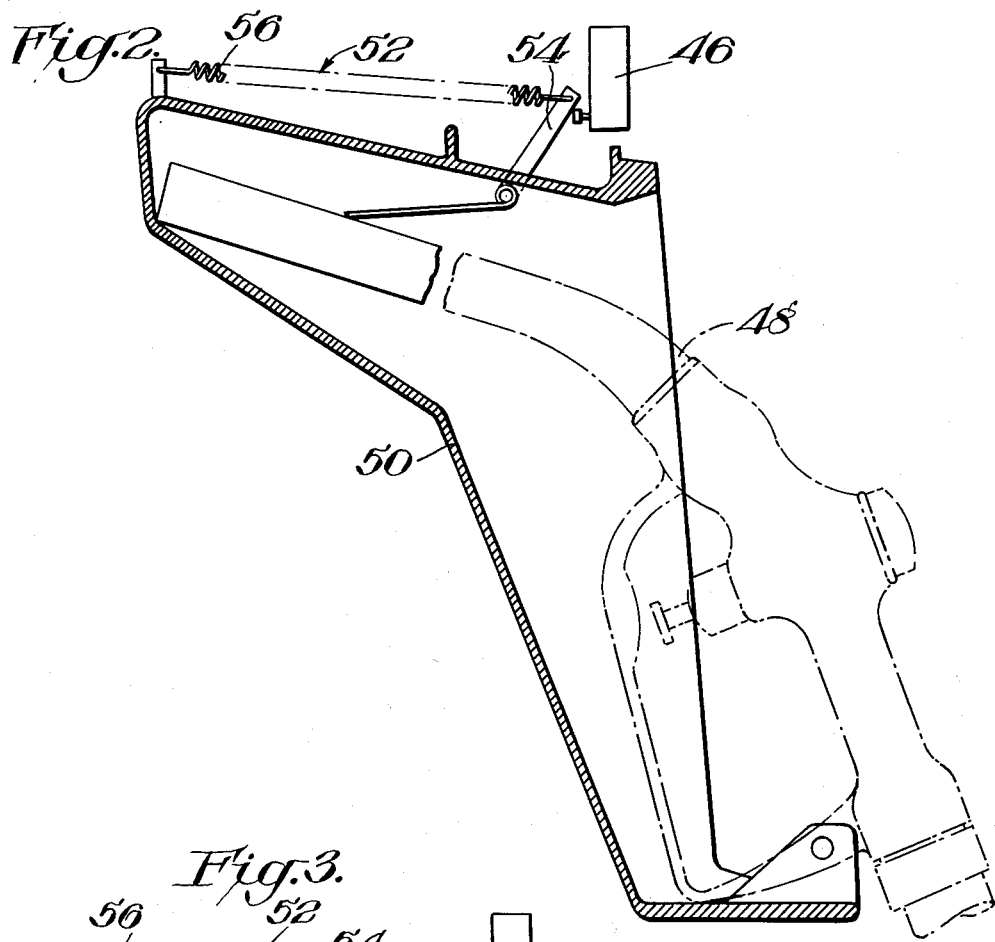
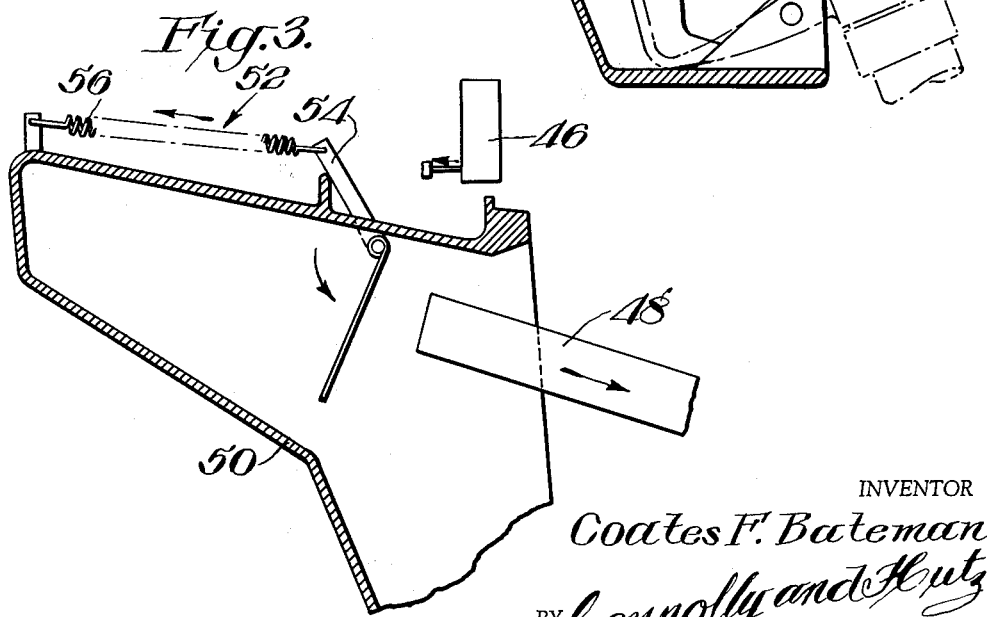
INVENTOR
Coates F. Bateman
BY Connolly and Hutz
ATTORNEYS

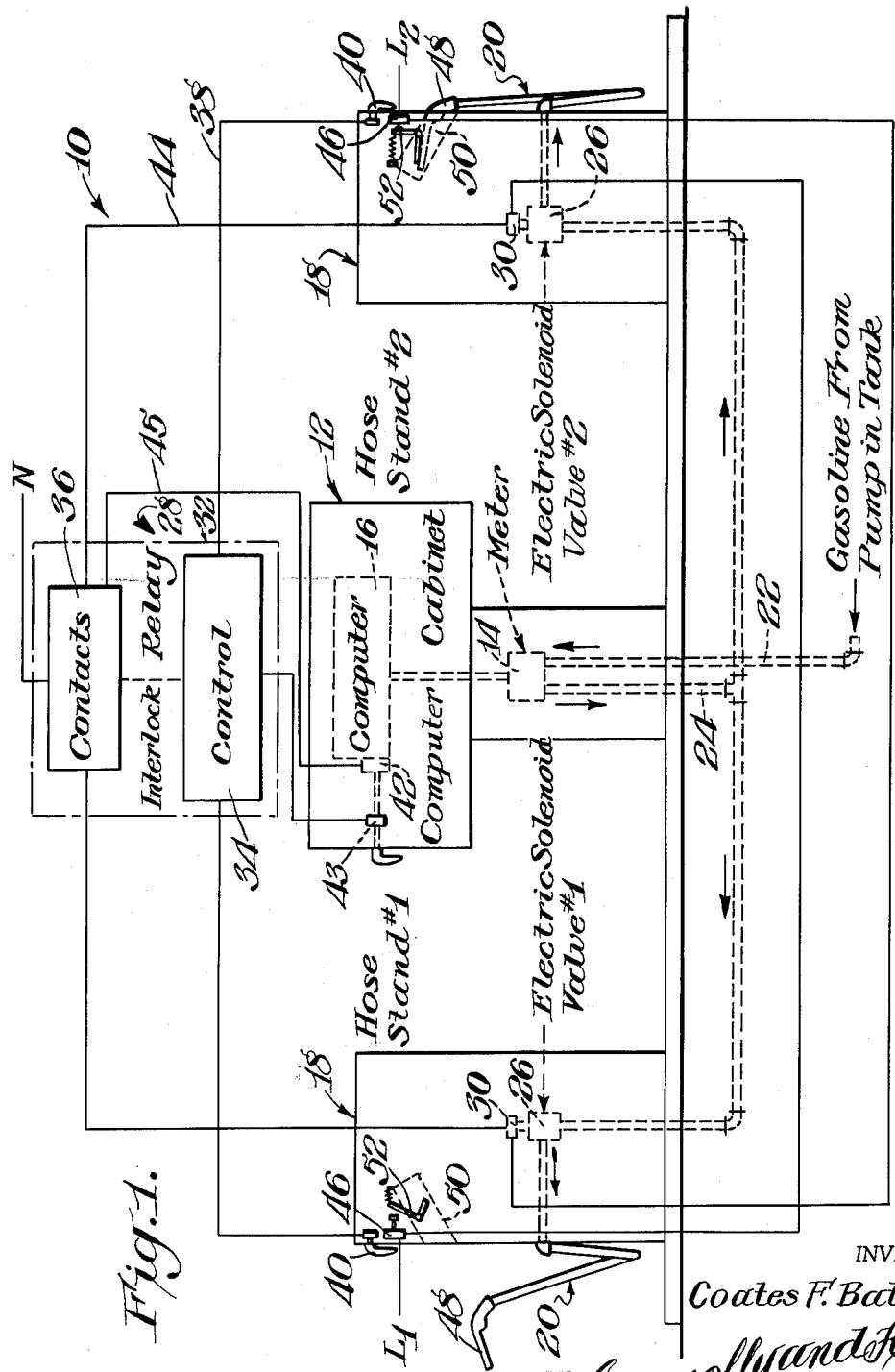

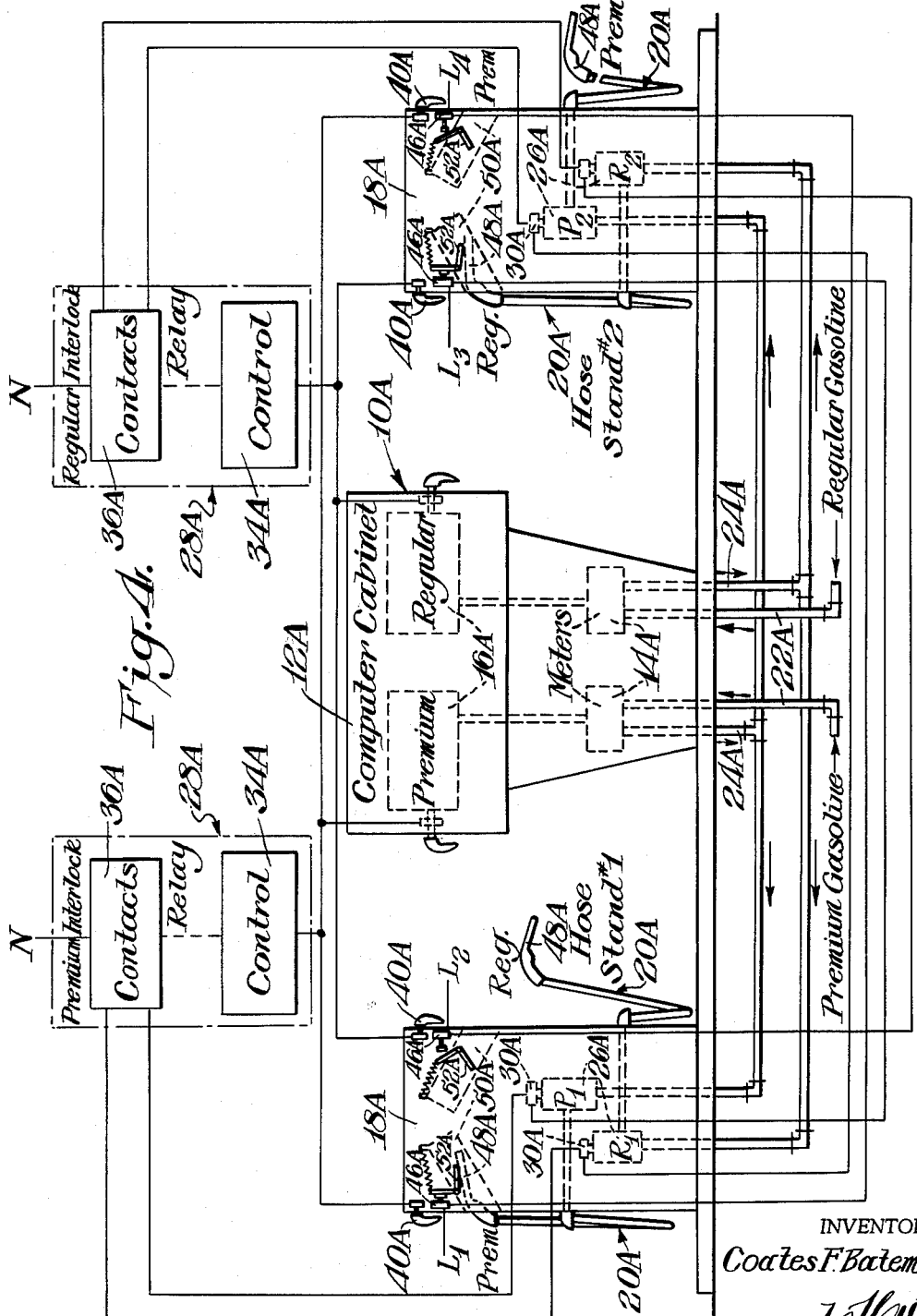

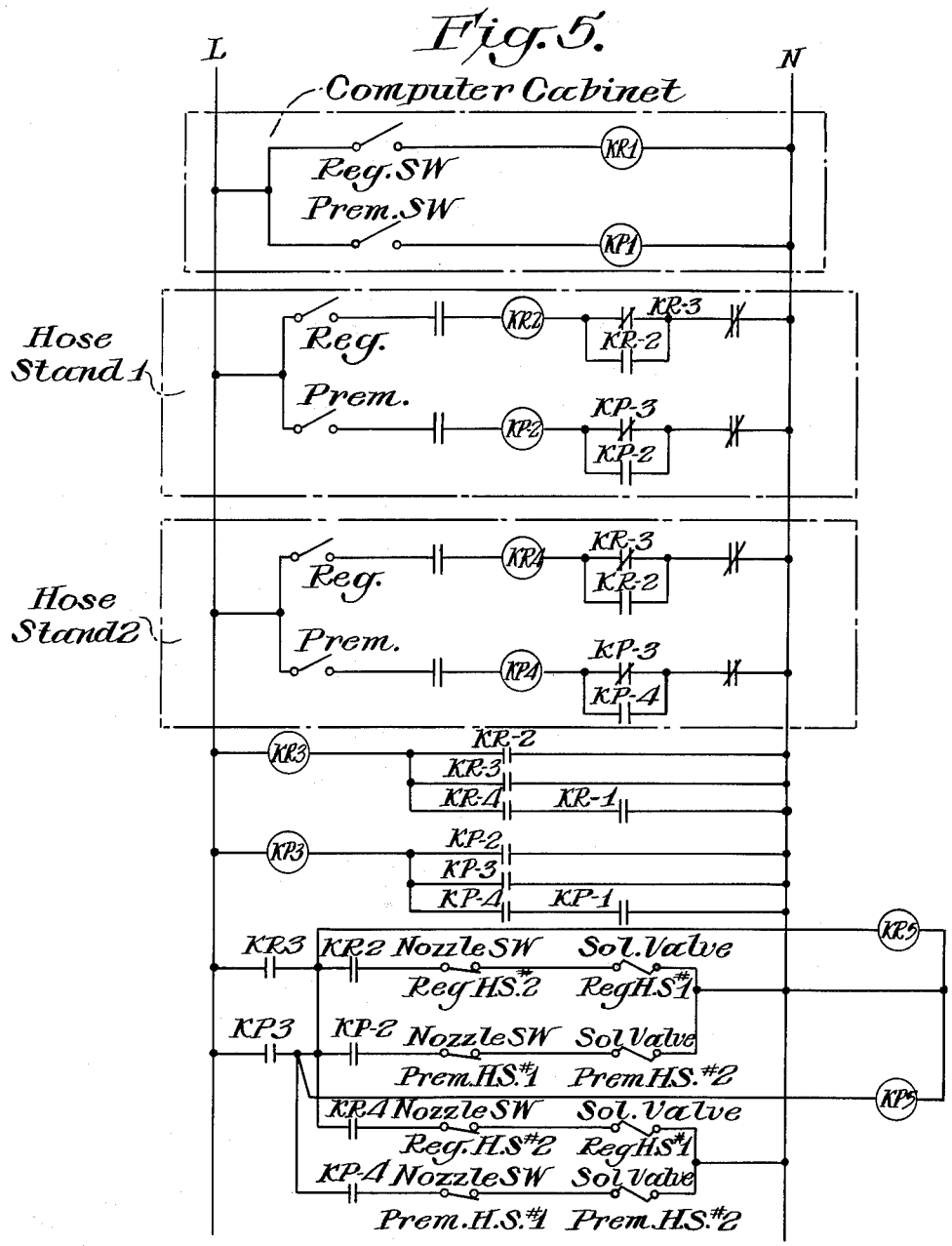

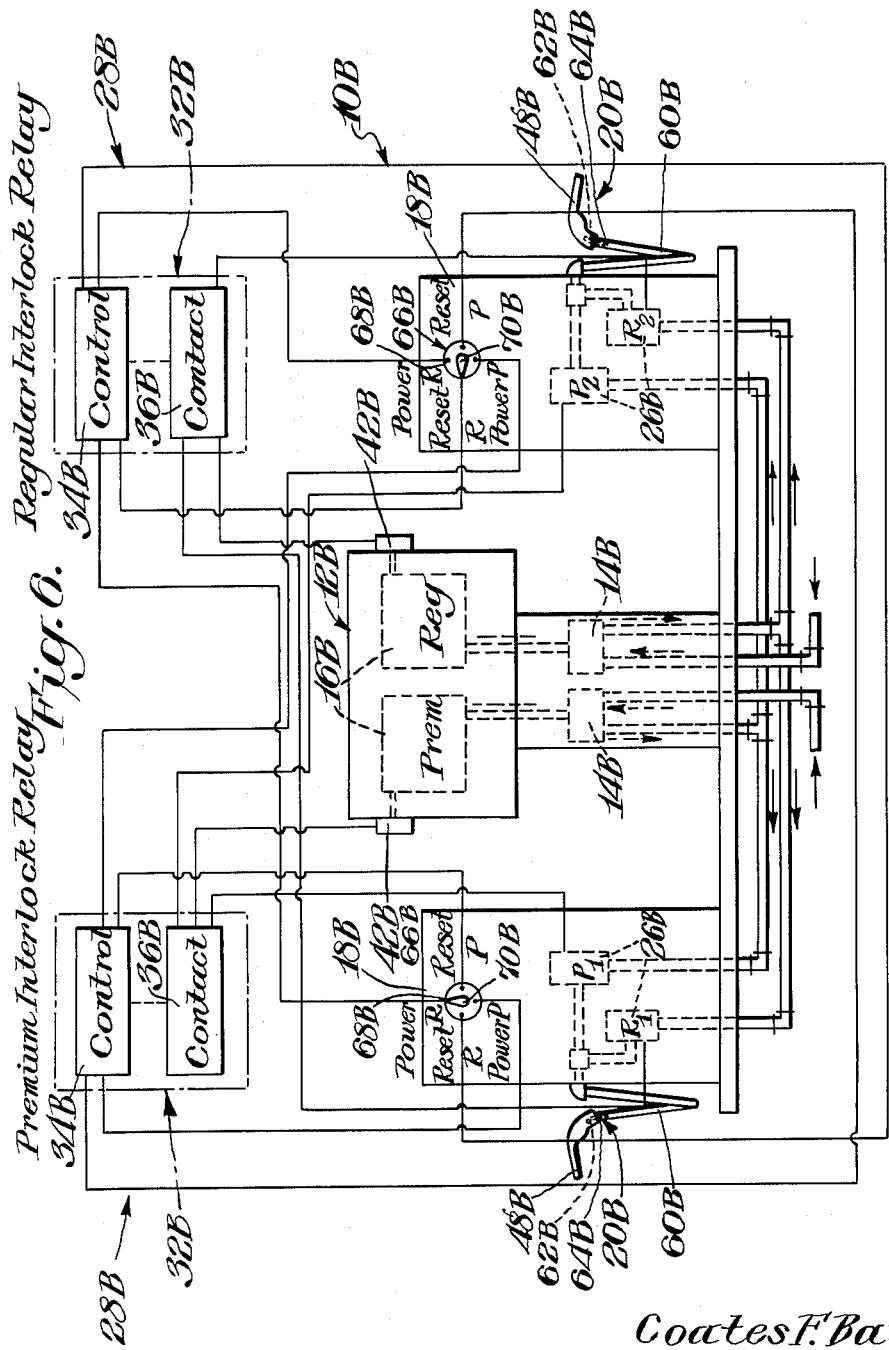

United States Patent Office 3,207,370
Patented Sept. 21, 1965

3,207,370
REMOTE DISPENSING SYSTEM
Coates F. Bateman, Salisbury, Md., assignor to Symington Wayne Corporation, a corporation of Maryland
Filed July 10, 1963, Ser. No. 294,135
9 Claims. (Cl. 222—26)

This invention relates to a fluid dispensing system in which dispensing components are displaced from a metering and computing unit, and it more particularly relates to such a system for installation in a gasoline service station.

Most existing gasoline dispensers mount the dispensing components such as hoses and nozzles and associated equipment upon the same housing incorporating the metering and computing elements. This conventional arrangement is substanially simple and economical. However, a motorist cannot readily observe the computing register while seated in an automobile whose tank is being filled from a conventional dispenser. Various electrically actuated remote computing and registering units have accordingly been proposed. However, such remote electrical units have not as yet been proven to the degree of economy and dependability that a conventional mechanical computing unit enjoys.

An object of this invention is accordingly to provide a simple and economical remote fluid dispensing system that can incorporate standard components.

Another object is to provide such a system which can utilize standard mechanical computing and registering units.

A further object is to provide such a system in which more than one product can be dispensed from a single hose stand.

In accordance with this invention at least two hose stands are installed remotely from each other and from a single computing and registering housing to which they are connected by piping. The cost and quantity of the dispensed fluid is metered within the central housing and indicated upon its computing component before it is conducted to the hose stand for dispensing. Interlocking circuits between the hose stands and the central housing prevent the same product from being dispensed from both of the hose stands at the same time. The interlocking circuit may be conveniently provided by electrical relays connected to sensing switches on the hose stands which inactivate each nozzle when the other is removed from its boot. The interlocking circuit may be associated with reset actuators upon each of the hose stands which remotely reset the central computing unit from the hose stands.

Each hose stand and central unit may be utilized for dispensing more than one product either through a pair of hoses and nozzles upon each stand or through one hose and nozzle upon each stand. A single hose arrangement of the latter type when utilized in conjunction with a unitary reset actuator and power switch upon each hose stand provides a particularly simple and economical interlocked remote multi-product dispensing system.

Novel features and advantages of the present invention will become apparent to one skilled in the art from a reading of the following description in conjunction with the accompanying drawings wherein similar reference characters refer to similar parts in which:

FIG. 1 is a schematic diagram of a single-product embodiment of this invention;

FIGS. 2 and 3 are enlarged cross-sectional views in elevation of a portion of the embodiment shown in FIG. 1 in two conditions of operation;

FIG. 4 is a schematic diagram of a two-product embodiment of this invention;

FIG. 5 is a schematic electrical diagram of the electrical system for the embodiment shown in FIG. 4; and FIG. 6 is a schematic diagram of another two-product embodiment of this invention.

In FIG. 1 is shown a remote dispensing system 10 including a central housing 12 enclosing a meter 14 and a computer 16 for respectively determining and indicating quantitiy and price of a dispensed fluid. Two hose stands 18 are installed remotely from each other and central housing 12 for conveniently dispensing fluid to separate automobiles. Hose and nozzle assemblies 20 dispense fluid to the automobiles in a conventional manner. Piping 22 connects meter 14 to a source of fluid such as gasoline in a storage tank. Piping 24 connects meter 14 to both of hose stands 18. Solenoid valves 26 are connected in the piping 24 within hose stands 18 ahead of hose and nozzle assemblies 20 for controlling the flow of fluid through them. Interlocking circuit 28 is connected between hose stands 20 and central housing 12 for preventing one product from being dispensed from both hose and nozzle assemblies 20 of the system at the same time.

Interlocking circuit 28 includes the electrical portion 30 of solenoid valves 26 and relay 32 which incorporates a control section 34 and a contact section 36. Control section 34 is connected by electrical leads 38 to remote reset actuators 40 on hose stands 20 and to remotely operable reset component 42 on central housing 12 connected to computing component 16. Remotely operated unit 42 is, for example, a conventional electrically operated reset unit. Lever 43 on central unit 12 can also directly reset computer 16. Interlock relay 32 is arranged to actuate the resetting of computer 16 only when both of the house nozzle assemblies 20 are stored. Electrical lead 45 from contact section 36 to computing unit 16 energizes the resetting of the computer only when the aforementioned condition exists as detected by the control section 34.

Contact section 36 also connects the electrical portions 30 of solenoid valves 26 to power source "N" through leads 44 and switches 46 upon the hose stands 18 remote from each solenoid valve 26. This prevents the dispensing of gasoline from either of the hose stands 20 if the opposite hose stand is in an operative position, namely with the nozzle 48 removed from storage boot 50 and out of contact with sensing devices 52, which are operatively engaged with switches 46. When hose and nozzle assembly 20 connected to hose stand No. 1 at the left hand side of FIG. 1 is removed from boot 50 in an operating position, solenoid valve 26 in hose stand No. 2 is maintained closed, and no reset can be accomplished by operation of reset lever 40 on hose stand No. 2.

FIGS. 2 and 3 are enlarged views of nozzle storage boots 50 and sensing linkages 52 associated with switches 46 for detecting the presence of nozzles 48 in storage boot 50 is in an inoperative position. Sensing linkages 52 include a pivoted detecting lever 54 and spring 56 for biasing the detecting linkage switch to the "off" position shown in FIG. 3 during which the remote solenoid valve is maintained closed as long as the immediate hoze nozzle 48 is removed from its boot 50 for dispensing as shown in FIG. 3.

FIG. 4 shows a system similar in all respects to that shown in FIG. 1 with the exeception that a pair of computer components 16A are mounted in central housing 12A, and two hose and nozzle assemblies 20A are mounted upon each hose stand 18A. The stands and central housing accordingly incorporate two of each component shown in FIG. 1 for each product which are designated as a regular and premium grade of gasoline.

In FIG. 5 is shown a schematic electrical diagram for the system shown in FIG. 4 in which self-explanatory legends indicate the functions accomplished by the switches and relays to accomplish the aforementioned functions.

In FIG. 6 is shown a schematic diagram of another system 10B in which a single hose and nozzle assembly 20B is mounted upon each hose stand 18B for dispensing both the premium and regular products whose metering and computing components 14B and 16B are incorporated in central housing 12B. Hoses 60B are, for example, of the coaxial type with a short tube 62B extending from the central hose 64B to minimize the amount of fluid that might be retained in nozzle 48B after each dispensing operation. This makes it possible to eliminate one hose and nozzle assembly 20B without unduly contaminating the fluids dispensed from the same nozzle.

Interlocking circuit 28B in FIG. 6 includes a pair of relays 32B with separate contact and control sections 36B and 34B connected to the solenoid valves 26B in the manner previously described. However, the need for any sensing means for the nozzles is eliminated by utilizing unitary reset actuators and power switches 66B upon each hose stand. Switches 66B each have multiple switching positions 68B for individually controlling actuation of reset means 42B on central housing 12B which can only be reset from each of the hose stands. The multiple switching positions are designated by the characters "Power R," "Reset R," "Power P" and "Reset P" for respectively designating the operating and reset positions for regular and premium gasolines.

Switching units 66B are connected to the control portions 34B of interlock relays 32B and the contact portions 36B are connected to the solenoid valves 26B and to the reset control 42B for both regular and premium products to prevent simultaneous dispensing of both products at one of the hose stands and simultaneous dispensing of a single product from both of the hose stands. The dispensing of either product from one hose stand is accomplished by turning selector switching element 70B to one of positions 68B which can be actuated only one at a time. Interlocking relays 32B prevent the resetting of computer units 16B when it is operating and closes the valve in the hose stand remote from the one that is dispensing in a conventional electrical switching manner.

The arrangement of FIG. 6 is highly flexible and permits one hose and nozzle assembly on each hose stand to dispense either one of two different products one at a time. The aforementioned arrangement also highly simplifies the interlocking required to provide the aforementioned functions.

What is claimed is:

1. A fluid dispensing system comprising a central housing, metering and computing components in said central housing for determining and indicating the quantity and price of fluid dispensed, at least two hose stands for remote installation from each other and from said central housing whereby the dispensing of fluid to separate automobiles is facilitated, dispensing means mounted upon said hose stands, piping connecting a source of fluid to said metering component in said central housing and therefrom to each of said hose stands, interlocking means between said hose stands and said central housing for preventing the same product from being dispensed from both of said hose stands at the same time, a pair of separate metering and computing units for a pair of fluid products being incorporated in said metering and computing component, hose means for dispensing both of said products being mounted upon each of said hose stands, and piping from said metering and computing components for conveying both of said products to each of said stands.

2. A system as set forth in claim 1 wherein said interlocking means comprises electrical solenoid valves in said hose stands controlling the dispensing of fluid therefrom, electrical control means including relay means connecting said electrical solenoid valves with a source of power, sensing switches being mounted upon said hose stands for detecting the presence of a hose nozzle stored therein in an inoperative position, and said sensing switches being connected to said relay means for preventing operation of the electrical solenoid in the other hose stand when the nozzle in the immediate hose stand is removed from contact with its sensing switch.

3. A system as set forth in claim 2 wherein said hose stands include storage boots for said nozzles, and said sensing switches being arranged upon said storing boots for sensing the presence of a hose nozzle in said boot in a stored inoperative position.

4. A system as set forth in claim 1 wherein a pair of hose means are mounted upon each of said hose stands for individually dispensing each of said products.

5. A system as set forth in claim 4 wherein a remotely operable reset means is mounted upon said computing and metering component, remote reset actuators being mounted upon each of said hose stands and connected to said remotely operable reset means, said interlocking means comprising interlocking relay means connecting said reset actuators with said reset means, and sensing switch means in the circuit of said interlocking relay means mounted upon said hose stands for detecting the presence of a hose means for the same product stored in an inoperable position upon the other hose stand whereby said reset actuators are each permitted to operate only when both of said hose means are stored in an inoperative position.

6. A system as set forth in claim 1 wherein one hose means is mounted upon each of said hose stands for dispensing both of said products one at a time, a remotely operable reset means is mounted upon said metering and computing component, unitary reset and power actuators being mounted upon each of said hose stands and connected to said reset means, said interlocking means comprising interlocking relays in the circuit between said unitary reset and power actuators and said reset means, and each of said reset and power actuators including a single actuating element and multiple switching positions to which it can be set for individually controlling actuation of said reset means whereby the reset means and power energization for dispensing only one product at one time may be operated from each of said reset and power actuators.

7. A system as set forth in claim 6 wherein each of said reset and power actuators includes separate power and reset positions whereby one of said actuators can first reset the computing unit for selecting one of said products when it is not being dispensed at the remote hose stand and then energizing the dispensing of said selected product to the exclusion of the other hose stand.

8. A system as set forth in claim 7 wherein said interlocking means for said hose stands include solenoid valves in the piping connected thereto to prevent simultaneous dispensing of both of said products at one of said hose stands and simultaneous dispensing of a single product from both of said hose stands.

9. A system as set forth in claim 7 wherein said unitary reset and power actuators comprise a rotating selector switch with separate positions for resetting and energizing the dispensing of said products one at a time.

References Cited by the Examiner

UNITED STATES PATENTS

| 1,929,986 | 10/33 | Mayo | 222—74 X |
| 2,530,113 | 11/50 | Bugg | 222—76 X |
| 3,069,051 | 12/62 | Phillips | 222—26 |

LOUIS J. DEMBO, *Primary Examiner.*